Jan. 9, 1951  G. T. HEMMETER  2,537,053
ROTARY BLANCHER OR COOKER
Filed Feb. 5, 1946  4 Sheets-Sheet 1
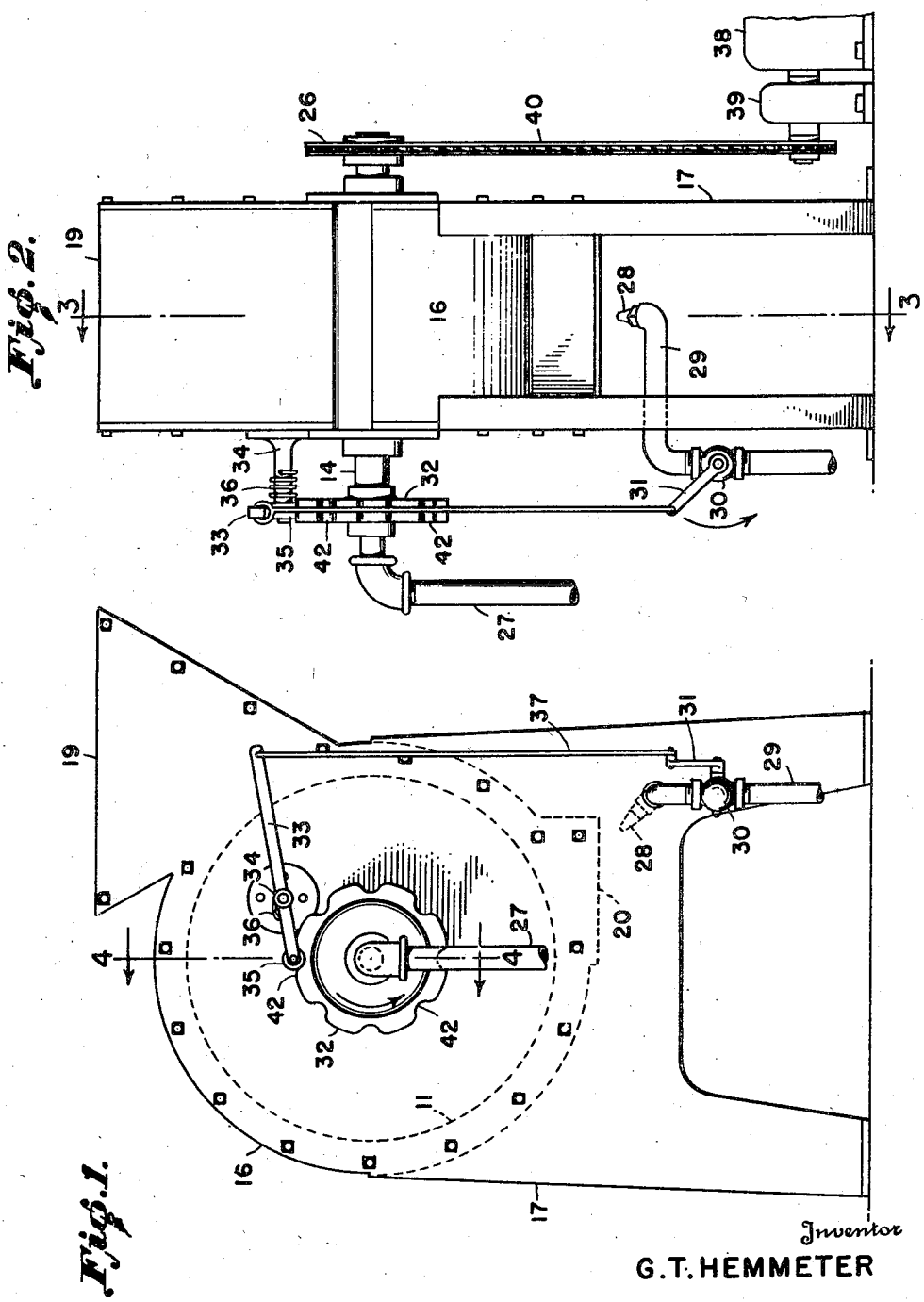
Inventor
G. T. HEMMETER
By A. J. Kramer
Attorney

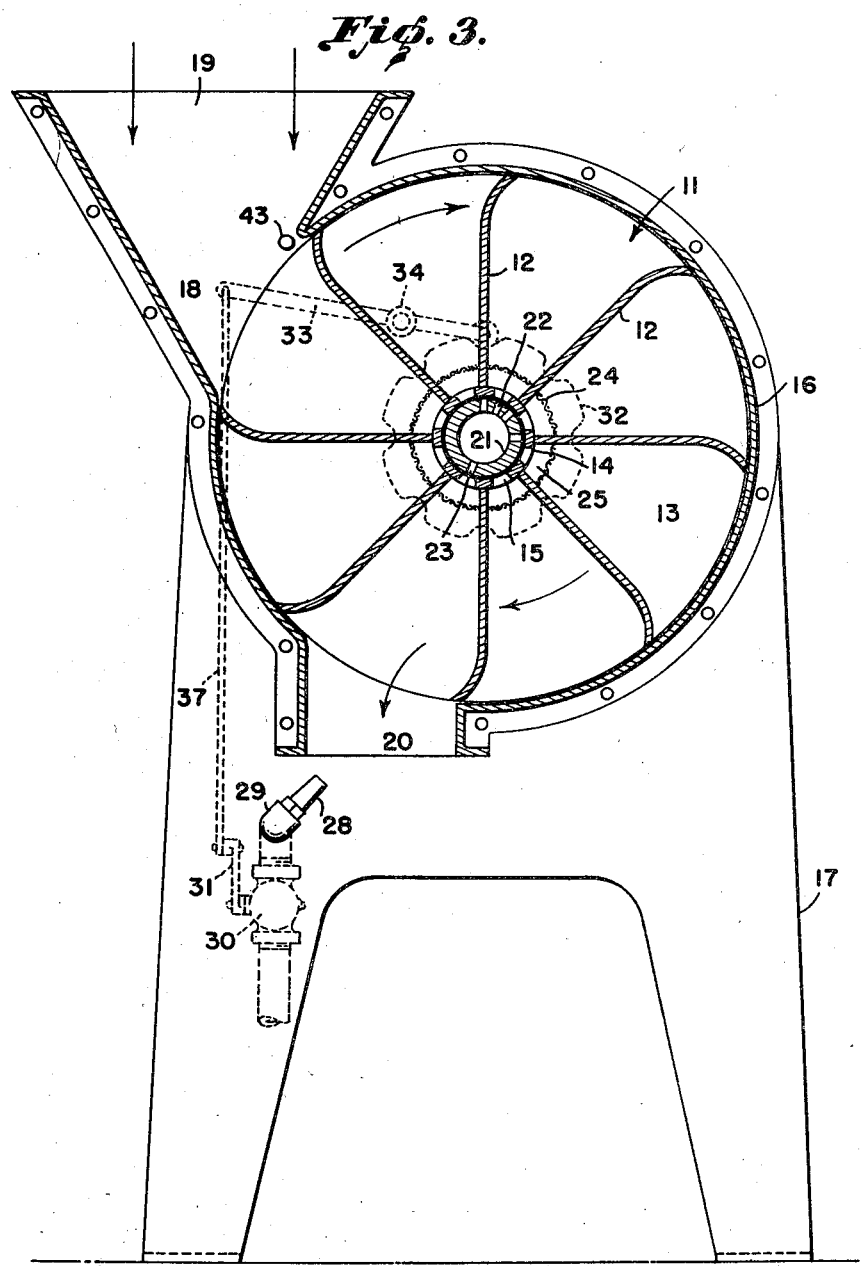

Jan. 9, 1951  G. T. HEMMETER  2,537,053
ROTARY BLANCHER OR COOKER
Filed Feb. 5, 1946  4 Sheets-Sheet 3

Inventor
G. T. HEMMETER
By A. J. Kramer
Attorney

Jan. 9, 1951 G. T. HEMMETER 2,537,053
ROTARY BLANCHER OR COOKER
Filed Feb. 5, 1946 4 Sheets-Sheet 4

Inventor
G.T. HEMMETER
By G. J. Kramer
Attorney

Patented Jan. 9, 1951

2,537,053

UNITED STATES PATENT OFFICE 2,537,053

ROTARY BLANCHER OR COOKER

George T. Hemmeter, Berkeley, Calif., assignor to The United States of America as represented by the Secretary of Agriculture Application February 5, 1946, Serial No. 645,695

8 Claims. (Cl. 99—443)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to blanchers or cookers, and the general object thereof is the provision of a device for the continuous blanching or cooking of fruits, vegetables, and other materials.

Another object is the provision of a device of the type mentioned which is compact, thereby effecting considerable saving in space over that required for conventional blanching equipment.

The advantages of the invention include low leaching losses, high sanitary features, conservation of steam, and the ability to vary the output over the full range of the device with equal effectiveness. Blanching or cooking may be accomplished with the device in the absence of air, a condition which tends to avoid oxidation of certain vitamins naturally occurring in certain fruits and vegetables.

Further objects and advantages of this invention will be apparent from the following description, considered together with the accompanying drawing.

In the drawing:

Figure 1 is a front elevational view of one embodiment of the invention.

Figure 2 is an end elevational view of the same embodiment.

Figure 3 is a section along the line 3—3 of Figure 2.

Figure 4:
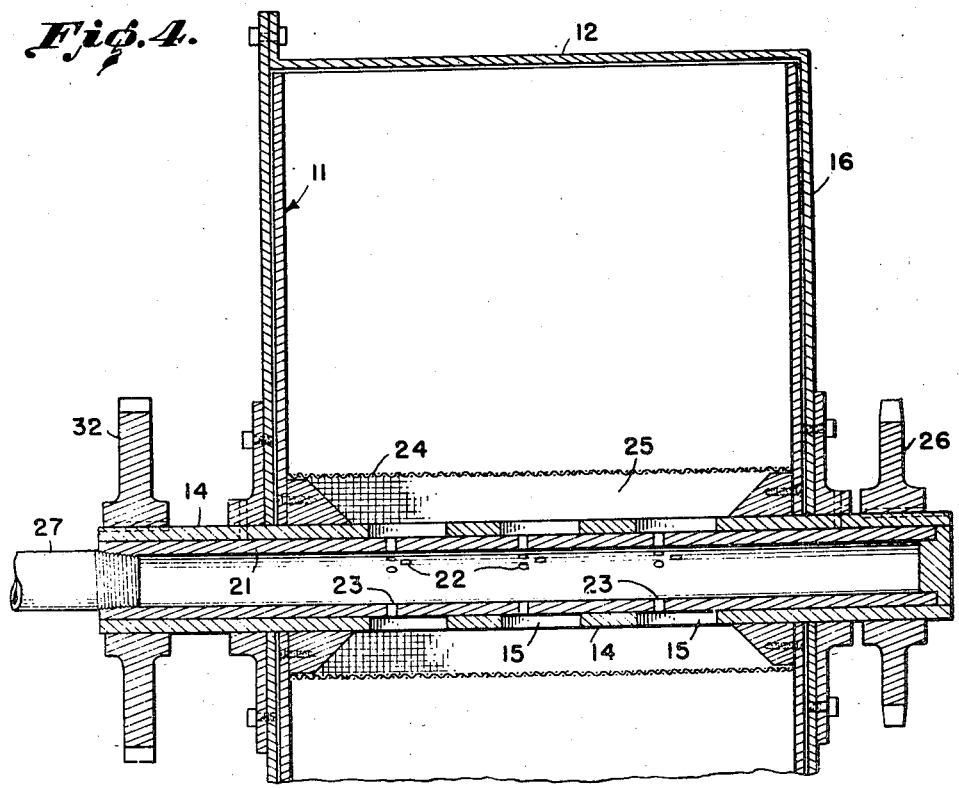
Figure 4 is an enlarged section along the line 4—4 of Figure 1.
Figure 5:
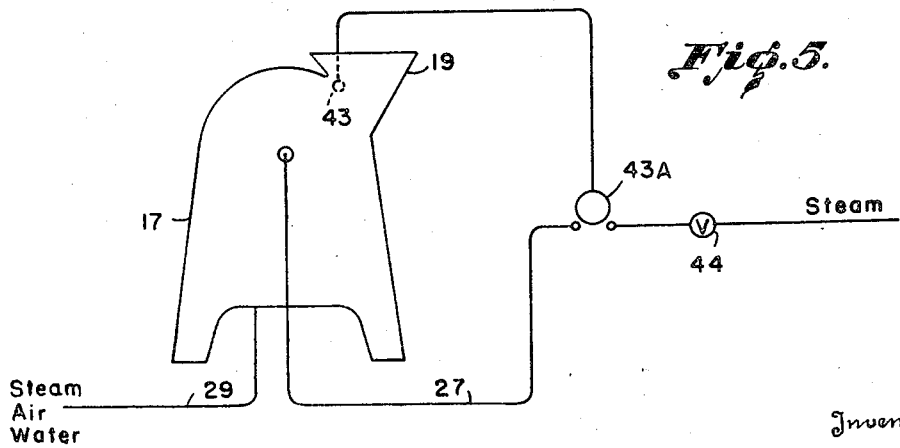
Figure 5 is a schematic view of the piping system associated with the blancher.

Referring with more particularity to the drawing in which like numerals designate like parts, the embodiment illustrated in Figures 1 to 5 comprises a rotor 11 formed of a plurality of imperforate radial plates 12, forming circumferentially disposed pockets 13 in which the material to be blanched or cooked is carried. The hub of the rotor comprises a hollow hub shaft 14 to which the plates 12 are secured. Apertures 15 are provided through the hub between the plates.

The rotor is enclosed in a stationary cylindrical housing 16 supported on a suitable frame 17. The circumferential wall of the housing fits closely to the rotor thus substantially to close the pockets. An inlet 18 is provided in the housing at the top thereof and to one side for feeding the material to be blanched into the pockets as the rotor turns. Surmounted on the inlet is a hopper 19 for feeding the material through the inlet. An outlet 20 is provided on the bottom of the housing beneath the inlet 18.

The rotor turns on a stationary hollow shaft 21 within the hollow hub shaft 14. The stationary shaft 21 is provided with apertures 22 in the upper quadrant opposite the one in which the hopper is disposed. It may also be provided with apertures 23 in the lower quadrant where the outlet is disposed and in line with the outlet radially. The apertures 22 and 23 register with the successive apertures 15 in the hub as the rotor turns.

To prevent material being treated from clogging these apertures and also to provide plenum chambers for steam entering the pockets 13 from the apertures, screens or perforated plates 24 are secured in the pockets a short distance outward from the hub thus to provide plenum chambers 25 having foraminous walls between them and the pockets. This permits the steam to expand before contacting the material loaded into the pockets, thereby presenting an even pressure to the under side of the material.

The hub shaft 14 extends beyond the sides of the housing on one side and is provided with a sprocket 26 or other suitable means for receiving power to turn the rotor, the direction of rotation being away from the hopper in the upper quadrants as shown by the directional arrows.

The stationary hollow shaft 21 is connected at one end to a steam pipe 27, the other end being closed.

The arrangement thus provides means for introducing steam into the pockets 13 between the time the material is fed into and from them.

Near the mouth of the outlet 20, a nozzle 28 is disposed, and it is directed upward at an angle. The nozzle is, through a pipe 29, connected to a source of air, steam, water, or other cleansing fluid, the function of which is to scavenge each pocket after it has discharged the blanched or cooked material into the outlet. This nozzle functions intermittently. The action is controlled by a valve 30 in the pipe 29. The valve lever 31 is operated by a linkage system associated with a cam 32 secured to the rotor 11.

The linkage system comprises a lever 33 pivoted at a point between its ends to a suitable stationary member, such as bracket 34 on the rotor housing. One end of the lever 33 is provided with a cam roller 35 engaging the cam under force of a spring 36. The other end of the lever 33 is connected to the valve lever 31 by a rod 37.

In operation, the material to be treated is fed into the hopper 19, and the rotor 11 is actuated at a constant, low speed, which may be accomplished by means of an electric motor 38 through speed reduction gears 39 connected to the sprocket 26 by means of the sprocket chain 40. The material falls into the pockets 13 and is carried around to the opposite quadrant on top where steam, led into the hollow shaft 21 through the steam pipe 27, passes through the holes 22, thence through the holes 15 into the plenum chambers 25, from whence it flows through and acts upon the loosely packed material in the pockets 13. As the steam is forced through the material, air is displaced ahead of it until it is expelled through the hopper. As the rotor continues to turn, the material passes to the lower side of the rotor where it is eventually discharged by gravity through the outlet 18. This may be assisted by steam through the apertures 23, if a positive means of discharge is desired. When the material has been discharged from a particular pocket, the cam roller momentarily slips into one of the series of depressions 42 of the cam, thereby opening the valve 30 and permitting a stream or jet of the cleansing fluid to be forced from the nozzle into the pocket to scavenge and prepare it for the next charge of material.

Steam in excess of that condensible by the material in the pockets 13 will escape between the rotor and the housing as in the case of the displaced air. Due to the seal effected between the rotor and the housing in the lower quadrant where the material being treated falls against the housing, the steam and displaced air is forced to escape through the hopper 19. For the most efficient operation, it is desirable to limit the amount of steam introduced to that which is condensible by the material being treated. In order to provide for such control, a heat responsive switch 43 is provided in the hopper adjacent the outlet 18 so that free steam in excess of that condensed by the material in the pockets contacts it. The switch operates controller 43a which in turn operates the modulating valve 44 to regulate the amount of steam flowing into the pocket.

Figure 6:
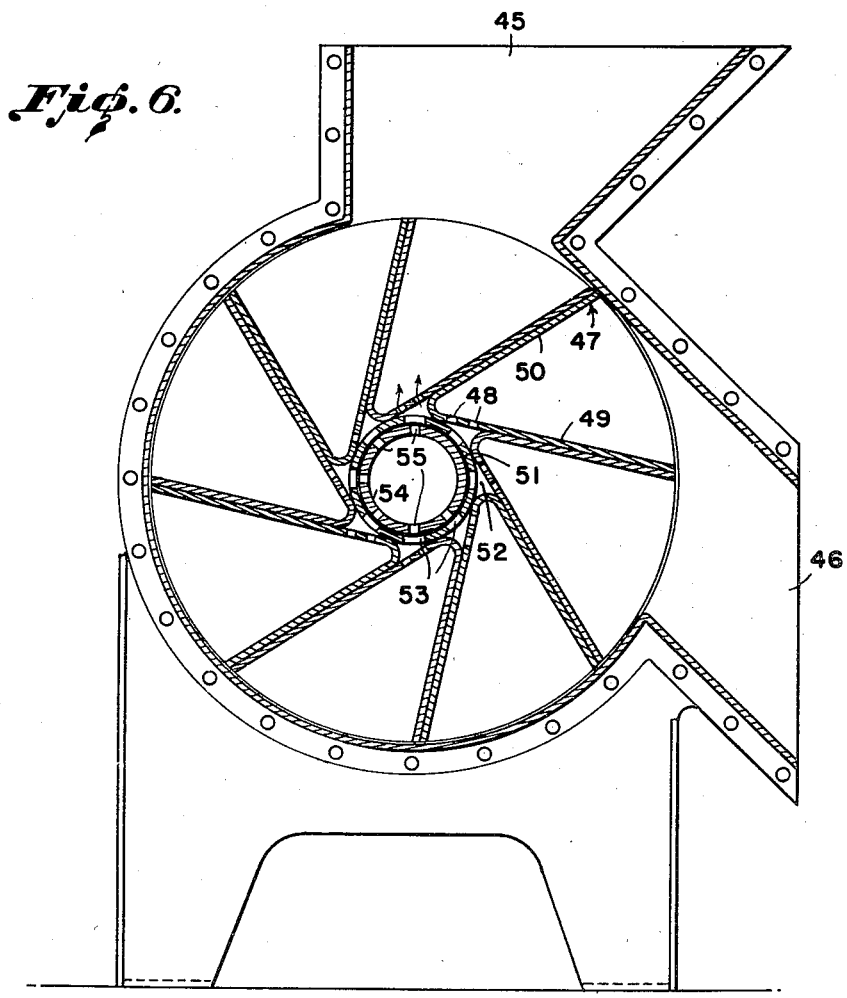
Figure 6 is an elevational section of a modified and preferred embodiment of the invention.
Figure 7:
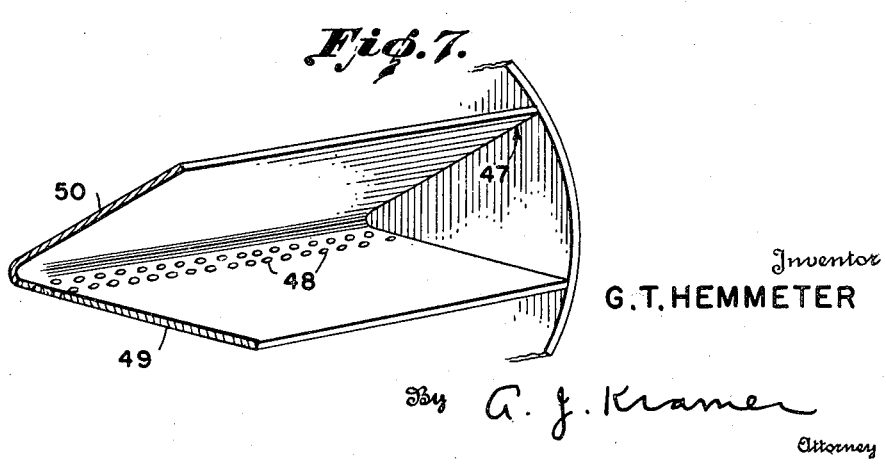
Figure 7 is a three-dimensional view of one sector of the rotor of Figure 6.

Modifications of the embodiment previously described are illustrated in Figures 6 and 7, and they comprise a simplified method of fabricating the rotor, whereby the walls of the pockets are arranged to provide plenum chambers between them without the need of the screens of the previous embodiment. This arrangement permits disposition of the hopper 45 at the top of the housing, thereby facilitating loading. It also permits disposition of the outlet 46 on one side and a greater effective heating cycle, that is, the use of a greater arc for the application of steam to the material. The latter results in increased capacity of the machine for a given size.

Referring with more particularity to Figures 6 and 7, the rotor comprises a plurality of angular members 47, comprising the pockets of the rotor. These members are each provided with rows of holes 48 on one side 49 near the vertex of the angle, the other side 50 being imperforate. These members are fitted together to form a circle, as shown, with the sides 49 contacting the hub 51 tangentially. The angle between the sides of the pocket member is such that the sides 50 are also tangent to the hub at the point of contact of the side 49 of its adjacent member. Accordingly, between the vertex of one member, side 49 of its adjacent member and the hub 51, there is formed a triangular plenum chamber 52. Holes 53 are provided in the hub at each plenum chamber. The stationary shaft 54 is also provided with holes 55 in the two quadrants opposite the outlet 46 and in the adjacent half quadrant at the bottom.

Having thus described my invention, I claim:

1. A blancher comprising a rotor having a series of circumferentially disposed pockets for holding material to be blanched, a stationary, cylindrical housing enclosing said rotor, the circumferential wall of the housing fitting closely to the rotor thus substantially to close the pockets, said housing having an inlet at the top for feeding the material into the pockets as the rotor turns and an outlet at the bottom through which the material is fed from the pockets, said rotor having a hollow hub, a hollow shaft rotatably supporting said hub, means for connecting said hollow shaft to a source of steam, a plenum chamber in each pocket adjacent the hub, the wall between the chamber and the pocket being foraminous, said hub and shaft having apertures which register during turning of the rotor for introducing steam from the source into the chambers between the time the material is fed into and from the pockets.

2. A blancher comprising a rotor having a series of circumferentially disposed pockets for holding material to be balanced, a stationary, cylindrical housing enclosing said rotor, the circumferential wall of the housing fitting closely to the rotor thus substantially to close the pockets, said housing having an inlet at the top for feeding the material into the pockets as the rotor turns and an outlet at the bottom through which the material is fed from the pockets, said rotor having a hollow hub, a hollow shaft rotatably supporting said hub, means for connecting said hollow shaft to a source of steam, a plenum chamber in each pocket adjacent the hub, the wall between the chamber and the pocket being foraminous, said hub having apertures therethrough adjacent the chambers, said shaft having apertures therethrough which register with the apertures through the hub during turning of the rotor for introducing steam from the source into the chambers between the time the material is fed into and from the pockets.

3. The blancher of claim 2 characterized in that a heat responsive switch is provided adjacent said inlet, a valve is provided between said source of steam and hollow shaft, and means is provided for operating said valve by said switch.

4. A rotor for a blancher comprising a hollow hub, a plurality of radial imperforate plates secured to the hub, and a foraminous wall across consecutive pairs of plates near the hub, said walls, plates, and hub forming plenum chambers, said hub having apertures therethrough between the plates communicating with said chambers.

5. A rotor for a blancher comprising a hub, a plurality of V-shaped channels secured to said hub in a side by side relation, one side only of each channel contacting the hub and being so arranged that said hub and channels form plenum chambers, said contacting side having holes therethrough between the vertex of its channel and the vertex of its adjacent channel, said hub having apertures therethrough communicating with said chambers.

6. A blancher comprising a rotor having a series of circumferentially disposed pockets for holding material to be blanched, a stationary, cylindrical housing enclosing said rotor, the circumferential wall of the housing fitting closely to the rotor thus substantially to close the pockets, said housing having an inlet at the top for feeding the material into the pockets as the rotor turns and an outlet at the bottom through which the material is fed from the pockets and means for introducing steam into the pockets between the time the material is fed into and from them, said blancher characterized in that a nozzle is provided near the outlet for ejecting cleansing fluid through the outlet into the pockets to scavenge them, a pipe with a valve therein is provided for carrying the cleansing fluid to the nozzle, and means is associated with the rotor for intermittently operating the valve to eject the cleansing fluid after the material is fed from the pockets.

7. The blancher of claim 6 characterized in that the means associated with the rotor comprises a cam rotated in coordination with the rotor and a linkage system associated with the cam to operate said valve.

8. A blancher comprising a rotor having a series of circumferentially disposed pockets for holding material to be blanched, a stationary, cylindrical housing enclosing said rotor, the circumferential wall of the housing fitting closely to the rotor thus substantially to close the pockets, said housing having an inlet at the top for feeding the material into the pockets as the rotor turns and an outlet at the bottom through which the material is fed from the pockets, said rotor having a hollow hub, a hollow shaft rotatably supporting said hub, means for connecting said hollow shaft to a source of steam, said hub and shaft having apertures which register during turning of the rotor for introducing steam from said source into the pockets between the time the material is fed into and from said pockets.

GEORGE T. HEMMETER.

REFERENCES CITED

The following references are of record in the file of this patent:

UNITED STATES PATENTS

| Number | Name | Date |
|---|---|---|
| 676,608 | Hale | June 18, 1901 |
| 817,495 | Loew | Apr. 10, 1906 |
| 1,010,637 | Kircheis | Dec. 5, 1911 |
| 1,225,212 | Benjamin | May 8, 1917 |
| 1,238,225 | Walker | Aug. 28, 1917 |
| 1,850,123 | Anderson | Mar. 22, 1932 |
| 1,969,717 | Bach | Aug. 14, 1934 |
| 2,374,425 | DeWeerth | Apr. 24, 1945 |